May 26, 1953  A. R. VOGEL  2,639,875
AIRCRAFT CONTROL ELEMENT FORCE PRODUCER
Filed Jan. 30, 1950  4 Sheets-Sheet 1

INVENTOR:
ALVIN R. VOGEL
BY Herbert E. Metcalf
HIS PATENT ATTORNEY

May 26, 1953  A. R. VOGEL  2,639,875
AIRCRAFT CONTROL ELEMENT FORCE PRODUCER
Filed Jan. 30, 1950  4 Sheets-Sheet 2

INVENTOR:
ALVIN R. VOGEL
BY Herbert E. Metcalf
HIS PATENT ATTORNEY

May 26, 1953  A. R. VOGEL  2,639,875
AIRCRAFT CONTROL ELEMENT FORCE PRODUCER
Filed Jan. 30, 1950  4 Sheets-Sheet 3

INVENTOR:
ALVIN R. VOGEL
BY Herbert E. Metcalf
HIS PATENT ATTORNEY

May 26, 1953 — A. R. VOGEL — 2,639,875
AIRCRAFT CONTROL ELEMENT FORCE PRODUCER
Filed Jan. 30, 1950
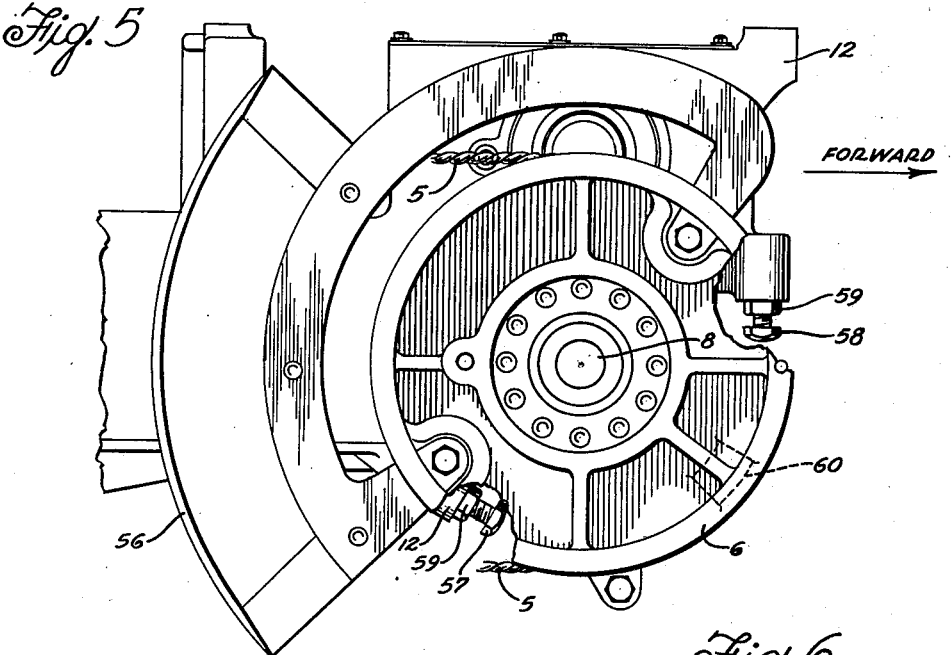
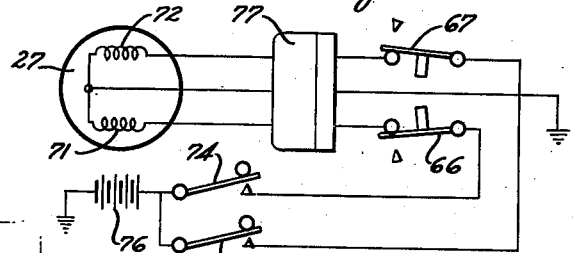
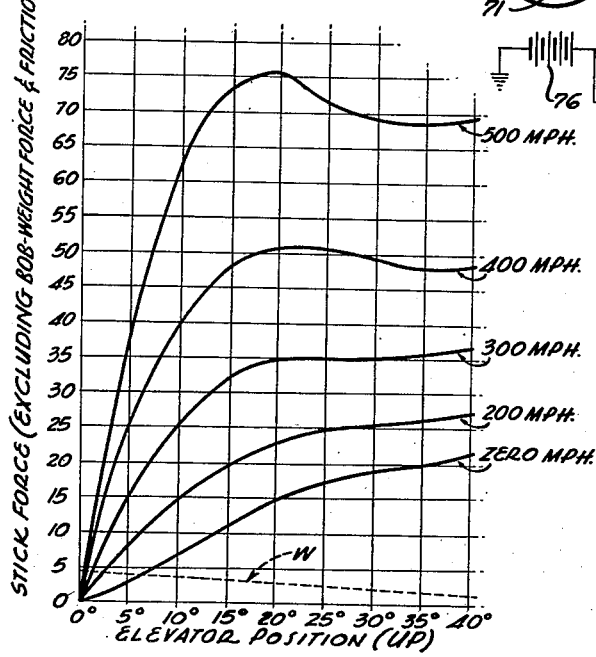
INVENTOR:
ALVIN R. VOGEL
BY Herbert E. Metcalf
HIS PATENT ATTORNEY Patented May 26, 1953

2,639,875

UNITED STATES PATENT OFFICE 2,639,875

AIRCRAFT CONTROL ELEMENT FORCE PRODUCER

Alvin R. Vogel, Los Angeles, Calif., assignor to Northrop Aircraft, Inc., Hawthorne, Calif., a corporation of California Application January 30, 1950, Serial No. 141,175

25 Claims. (Cl. 244—83)

This invention relates to airplane control element force producers, and more particularly, to an improved means capable of exerting desired feed-back forces to the pilot's control elements in any airplane, especially in an airplane employing power-operated control surfaces, and providing trimming control within the force producer.

In airplanes having power-operated control surfaces, no surface load is transmitted to the pilot from the control stick or column, or rudder pedals, so that he has no direct indication by means of "feel" as to the position of the control surfaces operated by these elements, or the stresses placed on his airplane by various combinations of speed, attitude, and control surface position. Hence, it is desirable to provide a synthetic "feel" in order to simulate conventional piloting procedures.

A control force producer, to provide this synthetic feel, ranges in composition from a simple centering spring to a relatively complicated system which can be responsive to changes in airspeed and/or normal acceleration in combination with a neutralizing force varying with amount of surface displacement from neutral. Reference is hereby made to copending applications Serial No. 52,367, filed October 1, 1948, now abandoned; Serial No. 69,956, filed January 8, 1949; Serial No. 88,165, filed April 18, 1949; and Serial No. 113,008, filed August 29, 1949; all of which disclose and claim various apparatus for providing certain feed-back forces on a pilot's control member.

In the force producer systems heretofore advanced, the components (such as centering springs, force bellows, bob weight, and the like) have been installed singly on individual airframe supports which require special structural consideration with reference to space and alignment problems. Each different airplane model, therefore, requires special attention to properly provide for a similar force producer system.

The present invention has for an object the provision of a force producer by means of which the forces appearing in the pilot's control member to be resisted by the pilot are produced as a combination of functions of airplane speed, control member deflection, and normal acceleration, this producer being a self-contained unit capable of complete assembly by itself and easy installation in an airplane structure, thus resulting in a lighter, and simpler installation than heretofore obtainable.

With full-power-operated controls, it has been found that compensating for out-of-trim moments of the airplane can more easily be accomplished by using the main control surfaces rather than separate trim tabs. Therefore, a trim actuator is also added to act on the linkage between the control member and the surface actuator, requiring more structural provisions in the airplane.

Another object of this invention is to provide a force producer assembly having the features mentioned above and also including trimming means as an integral part thereof.

With stick force mechanisms utilizing a force bellows to regulate the amount of applied stick force as a function of airspeed, it has been found desirable to connect the bellows diaphragm to the control stick by a linkage which results in a reverse gradient of "airspeed-applied" force versus control displacement, to reduce the volume of the bellows casing required. If this is accomplished by means of a cam, the actuating surface of the cam must be very carefully formed so that minute deviations will not be present to cause erratic variations in the final force relationship. A rather complicated and tedious program results, since no simple mathematical expression can be used to express the motion and resulting forces.

It is a further object of the present invention to incorporate in the force producer improved means of obtaining non-linear, reverse gradient bellows force variation, and at the same time provide smooth stick force relationships at all speeds and conditions, with ample range of control surface displacement.

This invention possesses numerous other objects and advantages which will be specifically pointed out or noted in the course of the detailed description to follow, but the invention is not limited to the particular apparatus disclosed herein, since other forms may be adopted within the scope of the appended claims.

Briefly, my invention comprises a support frame adapted to be removably attached to an aircraft structure, this frame mounting a bellows assembly, trim actuator, bob weight, control stick attachment, control travel stops, and control quadrant for attachment to operating means from a surface actuator. The bellows contains a centering force spring, and the bellows assembly is connected to apply its force to the control stick through a motion-translating link which also is constrained to pivot about a fixed axis perpendicular to the plane in which the link travels. The trim actuator forms a variable length link, which may be adjusted to obtain stick equilibrium at various control surface positions. Safety provisions are made in the force producer assembly to prevent trimming the system in the direction which will increase the stick force resulting from any surface displacement.

The invention may be more readily understood by reference to the accompanying drawings, wherein:

Figure 5 is an elevation view, taken as indicated by the line 5—5 in Figure 2, showing the cable quadrant with weight attached and showing surface travel stops.

Figure 6 is a schematic wiring diagram showing the electrical connections of a pair of safety switches in the trim actuator circuit.

Figure 7 is a graph of control stick force and elevator up deflection, at several airspeeds, showing the characteristics of the force producer in Figure 2.

Figures 1, 1A:
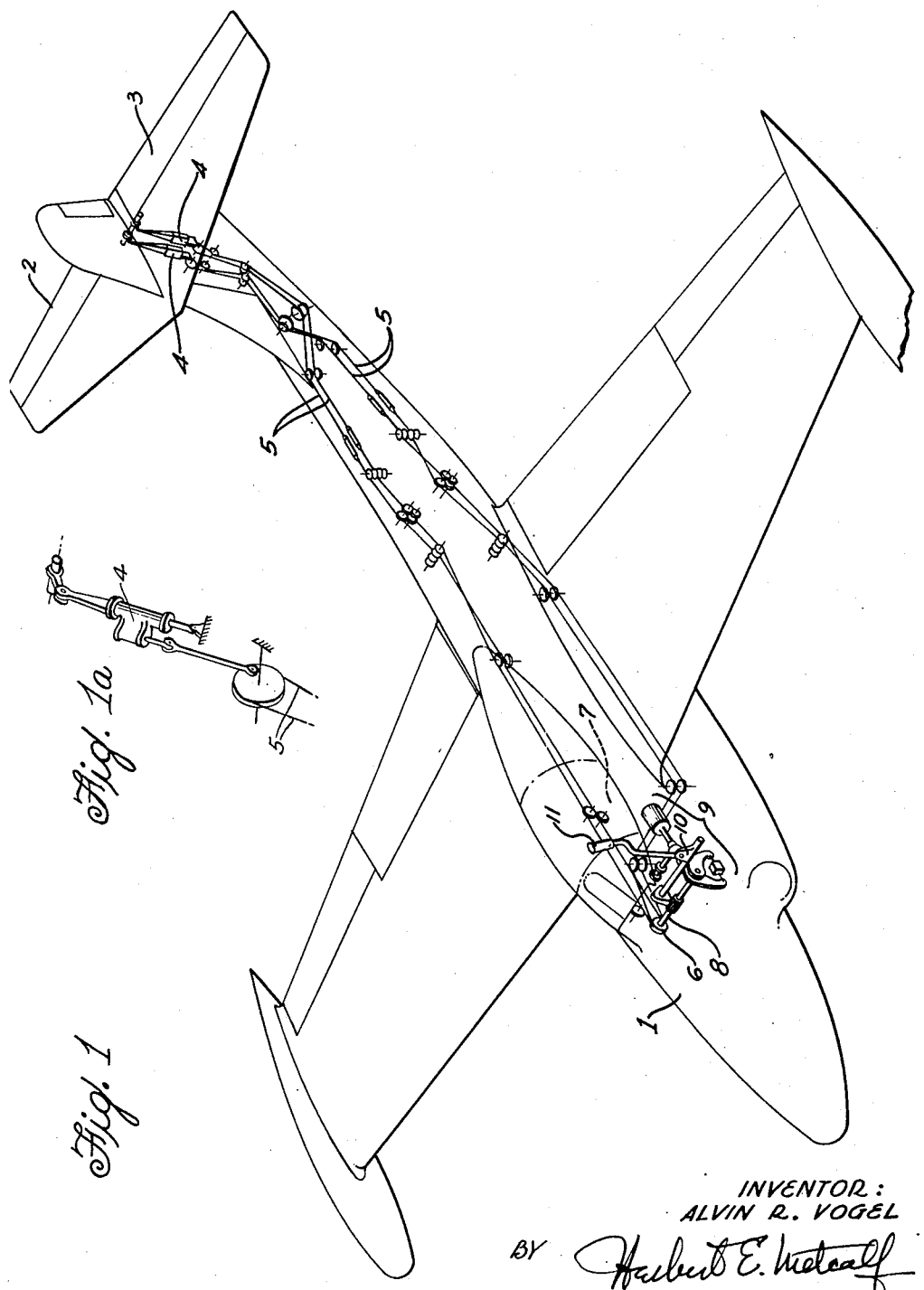
Figure 1 is a perspective view of an airplane showing the force producer of the present invention connected in the elevator control system operated from the pilot's control stick.
Figure 1a is a perspective enlarged view of one of the elevator power actuators, showing its installation connections.

Referring first to Figure 1 for a detailed description of this invention, an airplane 1 has two elevators 2 and 3 operated as a single unit by two cable-controlled hydraulic power actuators 4. Each actuator is connected by two control cables 5, 5 to a double control quadrant 6 beneath the floor of the cockpit 7. The double quadrant 6 is fixed to an output shaft 8 of a force producer assembly 9 which includes a stick attachment 10 to carry a control stick 11 for conventional operation of the elevators 2 and 3.

Figure 2:
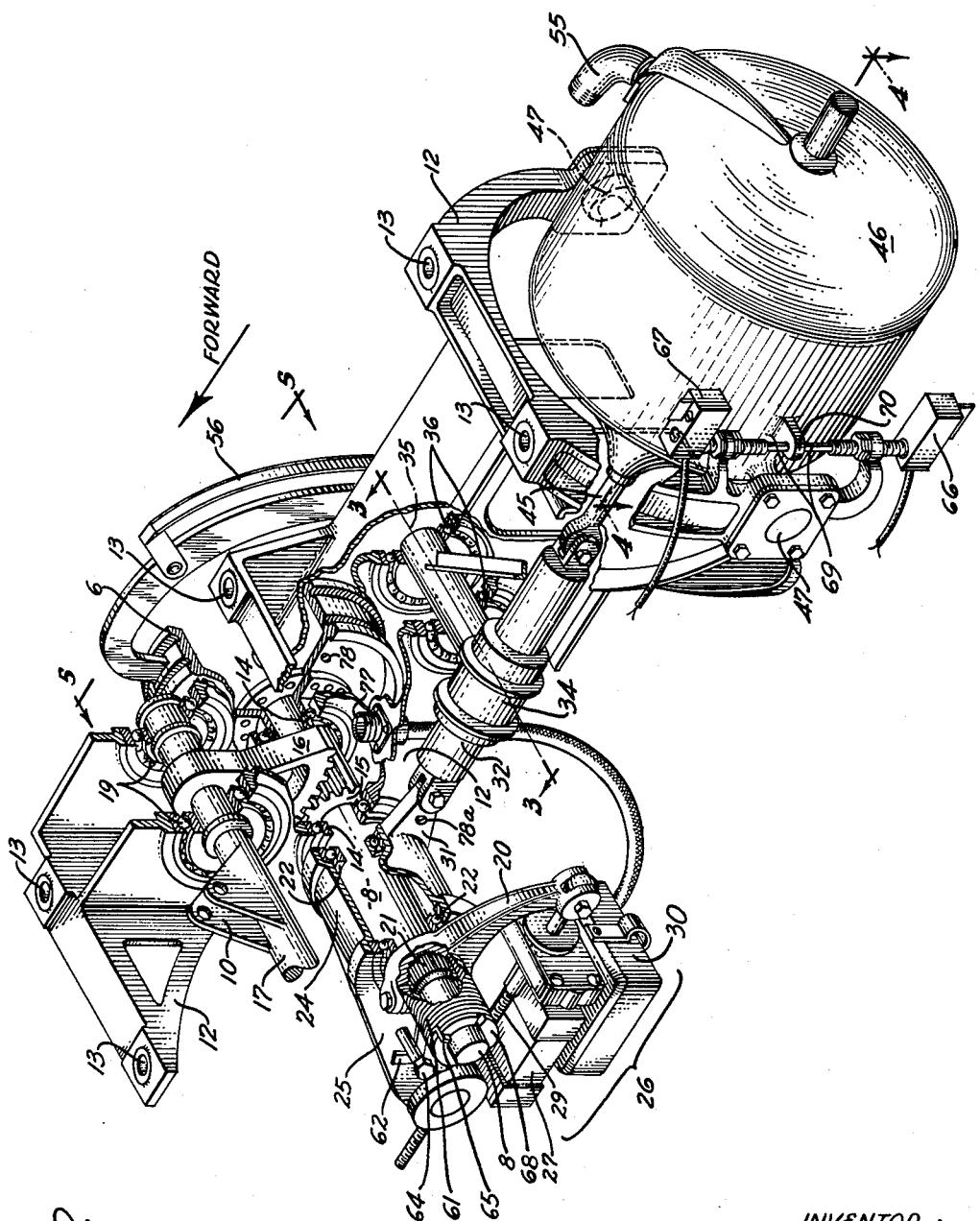
Figure 2 is a perspective view, partly cut-away, showing the complete force producer assembly of Figure 1.

The force producer assembly 9 is constructed as shown in Figure 2. Here, the output shaft 8 is rotatably mounted in a support frame 12 on shaft bearings 14. The frame 12 contains six mounting bosses 13 by which the entire assembly 9 is secured to the airframe. The output shaft 8 carries a gear 15 meshing with a sector 16 attached above to a stick shaft 17 also mounted in the frame 12, by stick bearings 19. The gear ratio in this preferred embodiment provides greater angular motion of the output shaft than the stick shaft 17 by a ratio of approximately four to one. The stick attachment 10 is fixed to the stick shaft 17, and, as shown in Figure 1, allows the control stick 11 to rotate the stick shaft 17 when moved in a fore-and-aft direction, and provides that the stick can be rocked from side to side for control of the aileron system (not shown).

The control stick 11 is thus connected to move the control cables 5 in proportion to stick movement in either forward or aft direction for normal control of the elevators 2 and 3 through the power actuators 4. The force producing means is connected to act on this system as will next be shown.

The output shaft 8 extends through the frame 12 to connect to a shaft arm 20 clamped to the output shaft 8 by serrations 21 so that the arm can be installed in different positions. Next to the shaft arm 20 on the inward side of the assembly are outer arm bearings 22 rotatably mounting a hub 24 of an outer arm 25 around the output shaft 8 so that the outer arm 25 can rotate relative to or concentrically with the output shaft 8. The outer arm 25 is offset toward the shaft arm 20 so that the ends of the respective arms are in a line perpendicular to the shaft.

A trim actuator assembly 26 is connected between the ends of the shaft arm 20 and outer arm 25. This assembly comprises an electric motor 27 driving a jack screw 29, and a limit switch box 30 attached to the motor 27. When energized, the motor will lengthen or shorten the jack screw 29, depending upon its direction of energization, thus rotating the outer arm 25 around the output shaft 8. The trim actuator 26 therefore holds the shaft arm 20 and the outer arm 25 in fixed angular relationship as long as the trim motor 27 remains inoperative. As the control stick 11 is moved in elevator-controlling directions, the shaft arm 20 and hub 24 will rotate as a unit.

Figure 3:
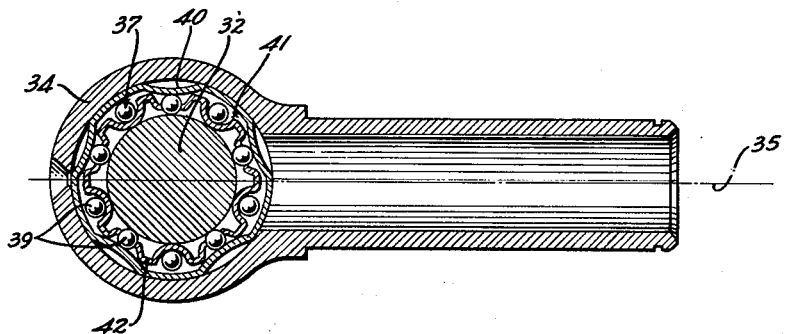
Figure 3 is a cross section view of the ball bearing trunnion, taken as indicated by the line 3—3 in Figure 2, showing internal construction of the bearing.

The hub 24 carries a crank 31 projecting rearwardly from its inner end, and the crank 31 is pivotally connected to a cylindrical rod 32 extending rearwardly through a trunnion 34. The trunnion is pivoted to rotate on a lateral axis 35 formed by trunnion bearings 36 in the frame 12. Within the trunnion, as shown in Figure 3, is pressed a linear ball bearing 37 which permits the rod 32 to roll axially through the trunnion. It is thus seen that as the hub 24 rotates, the crank 31 will move the rod 32 through the trunnion 34, and at the same time rotate the rod 32 about the lateral axis 35.

The linear ball bearing 37 comprises a plurality of oblong circuits of balls 39, each of which has the balls in one of its straight sides in bearing contact between the inner surface of a bearing sleeve 40 and the rod 32. The load is rolled freely along on the balls in this part of the circuit without rocking relative to the trunnion, and the balls in the remainder of each circuit are free to roll in clearance 41 provided in the sleeve 40. A retainer 42 within the sleeve guides the balls 39 in their proper path and prevents them from falling out when the rod 32 is removed from the bearing.

Figure 4:
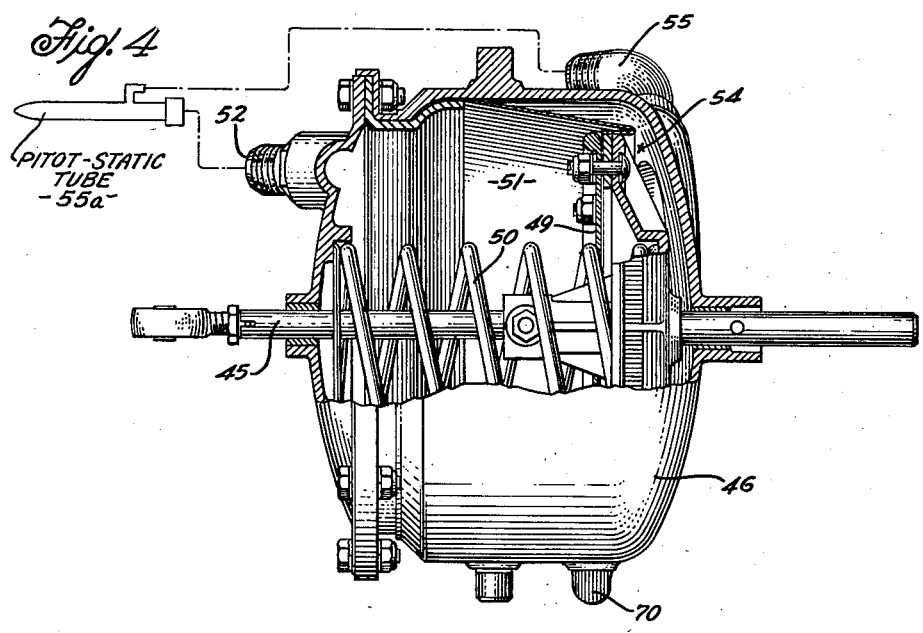
Figure 4 is a top section view, partly in plan, taken of the bellows assembly as indicated by the line 4—4 in Figure 2, showing the bellows diaphragm, rod, and spring.

The aft end of the rod 32 pivotally connects to a bellows shaft 45 projecting forwardly from a bellows casing 46 mounted on two opposite casing bearings 47 in the frame 12, so that the casing 46 is free to rotate in a vertical plane. Inside the casing 46 (Figure 4), the bellows shaft 45, which is slidable in the casing, is attached to an air tight diaphragm assembly 49 having its outer edge fixed to the casing 46. A compression type force spring 50, in the casing 46, reacts between the diaphragm assembly 49 and the forward end of the casing to urge the bellows shaft 45 to the rear. Forward of the diaphragm 49, a pressure chamber 51 is formed by reason of a pressure inlet 52 to be connected to a source of ram air when the airplane is in flight. To the rear of the diaphragm 49, a static chamber 54 is similarly formed by reason of a static outlet 55 to be connected to a source of static air pressure in the airplane. These two connections may be made to a Pitot-static tube 55a, for example.

The simple linkage as described completes the force producer, with the exception of a weight, to be described later, in another part of the assembly. At or near the neutral position of the control stick 11 and elevators 2 and 3, the trunnion rod 32 assumes a dead center position, with both its ends in line with the center of the output shaft 8 and the center point of the bellows casing 46. It is thus evident that as the hub 24 is rotated in either direction from this neutral, by the control stick 11, the trunnion rod 32 and the bellows shaft 45 will rotate in a vertical plane and pull the bellows shaft 45 against the force spring 50 to exert a restoring force on the system tending to restore the bellows linkage to its dead center position.

The bellows force spring 50 is preferably preloaded at neutral, or the linkage dead center. The force spring thus provides a force "feel" at landing speeds, when the pressure differential in the bellows at low airspeeds becomes substantially ineffective. Force characteristics of this bellows linkage geometry will be referred to later.

As shown in Figures 2 and 5, the quadrant 6 carries a weight 56 attached to the rear side thereof. Since the stick shaft 17 turns opposite to the output shaft 8 on which the quadrant is mounted, the weight 56 tends to pull the control stick 11 forward. As is well known, this weight causes a forward stick force proportional to the value of the positive normal acceleration (perpendicularly upward from the longitudinal center line) of the airplane, thus making it increasingly harder for the pilot to impose greater stresses on the airplane in the direction which is most likely to exceed the limit load factor of the airframe. At level flight, the weight force is, of course, balanced by a slight deflection of the bellows linkage from its dead center position, causing the force spring 50 to be exerting a moment on the control stick 11 equal and opposite to the moment exerted by the weight 56, neglecting friction.

It will be noted that since the weight travel is "stepped up" from stick travel by the sector 16 and gear 15, a weight saving is obtained as compared to a system having the bob weight move directly with the control stick. This weight saving is directly proportional to the gear ratio. Using a ratio of four to one, a four-pound bob weight in the present invention is equivalent to a 16 pound weight, for example, attached to move directly with the stick shaft.

The force producer assembly 9 of the present invention also includes the necessary elevator travel stops, as shown in Figure 5. The frame 12 mounts an "up" stop bolt 57 and a "down" stop bolt 58, both adjustable by means of lock nuts 59. A stop lug 60, fixed to the rim of the doublet quadrant 6, operates between the stop bolts 57 and 58 when the elevators are moved. At each extreme of the total elevator range, the lug 60 contacts the respective stop bolts 57 or 58 to limit the system movement at the desired positions.

To remove backlash from the connections of the trim actuator 26 to the shaft arm 20 and to the outer arm 25, an anti-backlash torsion spring 61, as shown in Figure 2, is installed at the end of the output shaft 8 adjacent to the shaft arm 20. The inner end of torsion spring 61 carries a hook 62 which is restrained by a bolt 64 mounted in the outer arm 25. The outer end of the spring has an ear 65 engaging a flanged nut 68 which fits between the spring 61 and the shaft 8 and is internally serrated at its inner end to fit the serrations 21 of the output shaft 8, after the spring is preloaded by a predetermined amount of wind-up. The preload of the torsion spring 61 keeps the two arms pushed apart as far as the trim actuator 26 will permit. Spring preload is substantially greater than the normal operating load between the two arms, so that the output shaft 8 and the hub 24 act as a single solid unit, with no lost motion when stick force is reversed as the system goes through neutral. The bellows force linkage needs no backlash removing means since the load carried by these parts is always in one direction. Backlash in the gearing amounts to about .002-inch, maximum, and hence is not objectionable, since it occurs only at the control stick connection into the system. It is important to note that no backlash can occur between the controlled surface and the force producing elements.

Another feature of this invention is a safety provision which makes it impossible for the pilot to operate the trim actuator in the wrong direction, i. e., in a direction that would increase the manual force required to maintain the control stick at the proper level flight position. As shown in Figure 2, this safety provision comprises an "up" safety switch 66 and a "down" safety switch 67 adjustably mounted on the frame 12 just to the rear of one side of the bellows casing pivot line. The safety switches are positioned with their operating plungers 69 facing toward each other, and a finger 70 extending outwardly from the casing 46 is located between the plungers 69. In the trimmed position of the bellows linkage, the switches are both adjusted to be non-actuated (circuit closed), and so that movement of the finger 70 a slight distance away from trim will actuate the switch toward which it is moved, and thus open the switch circuit. The safety switches 66 and 67 are wired as follows.

The trim motor 27 is a reversible D. C. motor having an "up" trim winding 71 and a "down" trim winding 72, as shown in Figure 6. The "up" safety switch 66 is wired in series with the "up" trim winding 71 and a manually-operated "nose up" trim switch 74 located within easy reach of the pilot. Similarly, the "down" safety switch 67 is wired in series with the "down" trim winding 72 and a "nose down" trim switch 75 beside the "nose up" trim switch 74. Both the pilot's switches are connected to a voltage supply 76, the grounded side of which is connected to the opposite ends of the motor windings 71 and 72. Operating the "nose up" trim switch 74, for example, energizes the "up" trim winding 71, if the "up" safety switch 66 is closed, to extend the trim actuator 26 and thus tend to move the control stick 11 aft. The limit switch box 30 (Figure 2) contains limit switches (not shown) which serve to open the trim circuit at each extreme end of actuator travel, as is well known in the art. An electrical plug connector 77, also mounted on the frame 12, provides a convenient means of joining the trim switch wiring to the actuator.

The safety switches 66 and 67 function in the following manner. If an out-of-trim condition occurs in the direction which requires the pilot to hold the control stick farther aft than normal, for example, therefore creating an excessive manual force to prevent the stick from falling forward, the pilot would desire to operate the "nose up" trim switch 74. Before operating any trim switch, it can be seen from the drawings that the force linkage is now in a position where the bellows shaft 45 is slanting downwardly at its forward end, thus positioning the casing finger 70 above its dead center position and opening the "down" safety switch 67. This position resulted from the aforementioned backward movement of the control stick. Now, if the pilot inadvertently closes the "nose down" trim switch 75, the trim actuator 26 cannot operate, since the open "down" safety switch 67 in the circuit prevents the "down" trim winding 72 from being energized. When the pilot closes the "nose up" trim switch 74, however, the force linkage will be moved back to the position where stick equilibrium occurs at the new stick and surface position, since the electrical circuit through the "up" safety switch 66 and the "up" trim winding 71 is completed.

Another feature to be noted is that if the pilot continues to hold the "nose up" trim switch 74 closed, in the foregoing example, the force linkage will automatically stop substantially at the predetermined equilibrium position because of the opening of the "up" safety switch 66 if the linkage passes beyond this desired position. Due to the geometry of the force system, the safety switches 66 and 67 are located at a very critical position so that movement of the linkage near the equilibrium position resulting from a slight stick movement will appreciably alter the relative finger and switch positions. This makes the safety switch action very sensitive around the equilibrium position, giving inherently accurate trimming characteristics.

That satisfactory force relationships are obtained through use of the present invention may be seen from an examination of the stick force versus elevator displacement curves shown in Figure 7, for elevator positions up from neutral. The solid curves represent a number of illustrative airspeeds, as indicated, and they exclude friction and the stick force produced by the bob weight 56, the latter being a constant shown by the dotted line W for all flight conditions where normal acceleration is zero. Actually, the force W is substantially equal to the force required because of friction in the system (approximately four pounds), so that for the curves shown, the values represent substantially actual forces.

The particular motion provided by this bellows linkage results in the exact desired force relationships. At small surface displacements the mechanical advantage of the force linkage relative to the control stick rises rapidly, and at greater surface displacements, the advantage tapers off. This is noted particularly at the higher speeds, where the force spring accounts for only a portion of the total stick force, the major portion being provided by pressure differential in the bellows casing 46, and is due to the fact that the displacement angle of the bellows shaft 45 increases, at first, and then decreases with increased surface deflection. At lower speeds, however, the resulting force curve is more nearly straight, and does not dip down because the centering force of the bellows spring 50 increases constantly with surface deflection, regardless of the amount of deflection from neutral.

The forces resulting from this simple linkage are easily expressed mathematically, and therefore it is an easy matter to design such a force producer to fit the needs of any airplane.

This force producer system additionally provides that for all normal flight conditions of the airplane, total stick force never decreases with increased deflection, i. e., normal flight never occurs beyond the peak of any of the curves shown in Figure 7. For example, at an indicated airspeed of 500 M. P. H., an elevator position of above 17° up would never be encountered because this would stress the airplane beyond its limit load factor and thus cause the structure to fail. In contrast to this, for lower airspeeds such as landing speed, for example, where more elevator deflection is normally required, the peaks do not occur as such, so that a smoothly rising curve results in all situations.

Referring again to Figure 7, it is understood that the total stick force produced by elevator deflections causing greater normal acceleration is, of course, equal to the value shown on the drawing plus a component caused by the mass of the bob weight 56. The bob weight 56 can be of any desired magnitude. It acts separately from the remainder of the force producer, and is preferably included to serve as a warning to the pilot against overloading the airplane by severe maneuvers.

The main component of this force producer assembly is the motion-translating link formed by the rod 32 linearly moving in the trunnion 34 at the same time as pivoting about the fixed lateral axis 35. This link makes possible the desired mechanical advantage curve of force versus displacement. To obtain the particular curve proportions shown in Figure 7, the following specific dimensions of the bellows linkage were used: Radius of hub crank, 2.5 inches. Distance of trunnion lateral axis from center line of output shaft, 5.5 inches. Length of trunnion rod, 7.5 inches. Distance of bellows casing axis from center line of output shaft, 15.0 inches. Spring rate of the force spring in the bellows, 26 pounds per inch, preloaded 10 pounds at dead center. These figures are illustrative only, and do not limit the invention to the particular values used in the specific embodiment shown herein, since the broad principles of the invention can be employed by substituting various other dimensions.

For ease in assembling and rigging the force producer assembly, a rig pin hole 78 in the quadrant (Figure 2) is provided in line with a similar hole (not shown) in the frame 12 and a third hole 78a near the end of the crank 31. These three points, when aligned, determine the dead center position of the bellows linkage and the "zero trim" distance between the outer arm 25 and the shaft arm 29.

Although the present invention has been described as applying to an elevator control system of an airplane, it is obvious that a system embodying the same principles and features can be utilized in an elevon (combination elevator and aileron) control system in an all-wing aircraft, or in other systems as desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an airplane having a surface control element to be operatively connected to power control means connected to move a control surface under power, a control element force producer comprising a rotatable control element attachment member, a power control means attachment member connected to rotate with said control element attachment member, a crank arm connected to rotate with said power control means attachment, a link pivotally connected to said arm, a link support rotatable on an axis parallel to the rotational axis of said arm, said link being smoothly movable in said link support along lines perpendicular to said link support axis so that said link can be translated through said support and simultaneously pivoted about said link support axis as said arm is rotated, a force transmitting member pivotally connected to said link on the opposite side of said link support from said crank arm, a force member support rotatable about a third axis parallel to said link support axis and lying in the plane formed by the aforementioned two axes, beyond said link support axis from said arm axis, said force transmitting member being smoothly movable in said force member support along lines perpendicular to said third axis so that said force transmitting member can be translated through said force member support and simultaneously pivoted about said third axis as said arm is rotated, and means for applying a tensile force in said force transmitting member directly proportional to a function of the air speed of said airplane, said force producer having one dead center position where the center lines of said crank arm, said link, and said force transmitting member are co-planar.

2. In an airplane having a surface control element to be operatively connected to power control means connected to move a control surface under power, a control element force producer comprising a rotatable control element attachment member, a power control means attachment member connected to rotate with said control element attachment member, a crank arm connected to rotate with said power control means attachment, a link pivotally connected to said arm, a link support rotatable on an axis parallel to the rotational axis of said arm, said link being smoothly movable in said link support along lines perpendicular to said link support axis so that said link can be translated through said support and simultaneously pivoted about said link support axis as said arm is rotated, a force bellows casing pivotally mounted on a bellows axis parallel to said link support axis and lying in the plane formed by said link support axis and said arm axis, said bellows axis lying beyond said link support axis from said arm axis, a bellows shaft extending from said casing and slidable in said casing along lines perpendicular to said bellows axis, said bellows shaft being pivotally connected to said link on the opposite side of said link support from said crank arm, a diaphragm in said casing attached to said shaft, and means for causing a differential pressure on opposite sides of said diaphragm to apply a tensile force to said bellows shaft increasing with increased airspeed of said airplane, said force producer having one dead center position, where said crank arm, said link, and said bellows shaft are co-linear.

3. A control force producer for a power-operated aircraft surface control system comprising an input member adapted to be connected to a pilot's control element, an output member adapted to be connected to surface operating means, said output member being movable in proportion to movement of said input member, and vice versa, a rotatable crank arm having a driving and driven connection with said members, a link pivotally connected to said arm, a link support rotatable on an axis parallel to the rotational axis of said arm, said link being smoothly movable in said link support along lines perpendicular to said link support axis so that said link can be translated through said support and simultaneously pivoted about said link support axis as said arm is rotated, a force transmitting element pivotally connected to said link on the opposite side of said link support from said crank arm, a force element support rotatable about a third axis parallel to said link support axis and lying in the plane formed by said link support axis and said arm axis, beyond said link support axis from said arm axis, said force transmitting element being smoothly movable in said force element support along lines perpendicular to said third axis so that said force transmitting element can be translated through said force element support and simultaneously pivoted about said third axis as said link is moved in response to arm rotation, and means for applying a tensile force in said force transmitting element directly proportional to a function of the airspeed of said airplane, said force producer having a dead center position where the center lines of said crank arm, said link, and said force transmitting element are co-planar.

4. Apparatus in accordance with claim 3 wherein said control force producer is mounted in an integral structural framework and adapted to be installed in said aircraft as a single complete unit.

5. Apparatus in accordance with claim 3 wherein said force transmitting member is a shaft and wherein said means for applying an airspeed-generated tensile force in said shaft includes a force bellows casing pivotally mounted on said third axis and forming a sliding support for said shaft, said shaft extending through said casing, a diaphragm in said casing attached to said shaft, a pressure chamber on the link side of said diaphragm adapted to be connected to a source of ram air pressure during flight of said aircraft, and a static chamber on the other side of said diaphragm adapted to be connected to a source of static air pressure during flight of said aircraft.

6. Apparatus in accordance with claim 5 wherein said bellows casing contains an elastic element connected to said shaft to increase said tensile force in said shaft as said force producer is moved away from said dead center position.

7. Apparatus in accordance with claim 3 wherein elastic centering means is connected to act on said pilot's control element in addition to the forces developed by said airspeed, said elastic centering means having a dead center position coinciding with said first mentioned dead center position.

8. Apparatus in accordance with claim 3 wherein said aircraft surface is a pitch-controlling surface, said input and output members are rotatable, and including motion transmitting means connecting said output member to rotate at a stepped up velocity from said input member, and a mass attached to one side of said output member to tend to move said pilot's control element in a "nose down" direction.

9. Apparatus in accordance with claim 8 wherein said control force producer, said motion transmitting means, and said mass are mounted in an integral structural framework and adapted to be installed in said aircraft as a single complete unit.

10. Apparatus in accordance with claim 3 wherein a variable length trimmer is pivotally connected directly between said crank arm and one of said members, whereby a change in length of said trimmer causes a new position of said pilot's control element to correspond to said dead center position of said force producer.

11. Apparatus in accordance with claim 3 wherein an electrically operated variable length reversible trim actuator is pivotally connected between said crank arm and one of said members, and including actuator control means operatively connected to said trim actuator and located convenient to the pilot of said aircraft.

12. Apparatus in accordance with claim 11 wherein said actuator control means comprises a first trim control switch wired in an electrical circuit to extend said trim actuator to shift said force producer relative to said pilot's control in one direction, a second trim control switch wired in another circuit to retract said trim actuator to shift said force producer in the opposite direction relative to said pilot's control, and including a pair of safety switches, normally closed, the first of said pair wired in series with said first trim switch and the second of said pair wired in series with said second trim switch, said first safety switch being mounted to be mechanically opened whenever said force producer is deflected in said one direction to one side of said dead center, and said second safety switch being mounted to be mechanically opened whenever said force producer is deflected in said opposite direction to the other side of said dead center, whereby, for any out-of-trim condition of said surface control system, only the particular trim switch circuit which will enable a decrease of externally applied pilot's control force can be electrically completed by trim switch operation.

13. Apparatus in accordance with claim 12 wherein said force producer, said trim actuator, and said safety switches are mounted in an integral structural framework and adapted to be installed in said aircraft as a single complete unit.

14. Apparatus in accordance with claim 3 wherein an electrically operated, variable length, reversible trim actuator is pivotally connected between said crank arm and one of said members, said aircraft surface is a pitch-controlling surface, and including actuator control means operatively connected to said trim actuator and located convenient to the pilot of said aircraft, said actuator control means comprising a "nose up" trim control switch wired in an electrical circuit to energize said trim actuator in a direction to shift said force producer to tend to move said pilot's control element in a "nose up" direction, a "nose down" trim control switch wired in another circuit to energize said actuator in the opposite direction to tend to move said pilot's control element in a "nose down" direction, and including an "up" safety switch wired in series with said "nose up" trim switch, a "down" safety switch wired in series with said "nose down" trim switch, both safety switches normally closed, said "up" safety switch being positioned to be mechanically opened by movement of said force producer past said dead center position in the direction caused by movement of said pilot's control element in a "nose down" direction, and said "down" safety switch being positioned to be mechanically opened by movement of said force producer past said dead center position in the direction caused by movement of said pilot's control element in a "nose up" direction, whereby, at any position of said force producer except said dead center, only that particular trim switch circuit which will tend to shift said force producer back toward said dead center can be completed by trim switch operation.

15. Apparatus in accordance with claim 3 wherein said input and output members are rotatable, said crank arm is connected to rotate concentrically with one of said members, and wherein said crank arm connection comprises a first driver arm fixed to rotate with said crank arm, a second driver arm fixed to rotate with said one member, and a variable length trimmer pivotally connected between said driver arms to adjust the distance between said driver arms in either direction at will, whereby a change in length of said trimmer moves said force transmitting element relative to said pilot's control element.

16. Apparatus in accordance with claim 15 wherein said control force producer and said trimmer are mounted in an integral structural framework and adapted to be installed in said aircraft as a single complete unit.

17. Apparatus in accordance with claim 3 wherein said input and output members are rotatable, said crank arm is connected to rotate concentrically with one of said members, and wherein said crank arm connection comprises a first driver arm fixed to rotate with said crank arm, a second driver arm fixed to rotate with said one member, and an electrically operated variable length reversible trim actuator pivotally connected between said driver arms to adjust the distance between said driver arms in either direction at will, said actuator being positioned with its weight substantially balanced under said one member, and including actuator control means, operatively connected to said trim actuator, located convenient to the pilot of said aircraft.

18. In an airplane having a control surface connected to be moved under power by movement of a pilot's control element, control element force producing means comprising a rotatable crank having a driven and driving connection with said control element, a link pivotally connected to said crank, a link support rotatable on an axis parallel to the rotational axis of said crank, said link being smoothly movable in said link support along lines perpendicular to said link support axis, so that said link can be translated through said support and simultaneously pivoted about said link support axis as said crank is rotated, a force transmitting element pivotally connected to said link on the opposite side of said link support from said crank, a force element support rotatable about a third axis parallel to said link support axis and lying in the plane formed by said link support axis and said crank axis, beyond said link support axis from said crank axis, said force transmitting element being smoothly movable in said force element support along lines perpendicular to said third axis, so that said force transmitting element can be translated through said force element support and simultaneously pivoted about said third axis as said link is moved in response to crank rotation, and means for applying a predetermined tensile load in said force transmitting element, said force producing means having a dead center position where the connections at both ends of said link lie in said plane.

19. Apparatus in accordance with claim 18 wherein elastic centering means is additionally connected to act on said pilot's control element, said elastic centering means having a dead center position coinciding with said first mentioned dead center position.

20. Apparatus in accordance with claim 18 wherein said control surface is a pitch-controlling surface, and including a rotatable member connected to said pilot's control element to rotate at a stepped up velocity from said pilot's control element, and a mass attached to one side of said member to tend to move said pilot's control element in a "nose down" direction.

21. Apparatus in accordance with claim 18 wherein a variable length trimmer is pivotally connected between said crank and said pilot's control element, whereby a change in length of said trimmer causes a new position of said pilot's control element to correspond with said dead center position.

22. Apparatus in accordance with claim 18 wherein an electrically operated reversible actuator is pivotally connected between said crank and said pilot's control element, and including actuator control means located convenient to the pilot of said aircraft, said control means comprising a first trim control switch wired in an electrical circuit to extend said actuator to shift said force producing means relative to said pilot's control in one direction, a second trim control switch wired in another circuit to retract said actuator to shift said force producing means in the opposite direction relative to said pilot's control, and safety switching means included in said circuits to mechanically open each respective trim switch circuit, as said force producing means is deflected past said dead center position, to prevent completion of the particular trim circuit which would tend to shift said force producing means farther from said dead center.

23. Apparatus in accordance with claim 22 wherein said safety switching means comprises a pair of safety switches, normally closed, the first of said pair wired in series with said first trim switch and the second of said pair wired in series with said second trim switch, said first safety switch positioned to be mechanically opened whenever said force producing means is deflected in said one direction to one side of said center, and said second safety switch positioned to be mechanically opened whenever said force producing means is deflected in said opposite direction to the other side of said dead center.

24. Apparatus in accordance with claim 18 wherein said tensile load in said force transmitting element is generated as a function of airspeed of said airplane.

25. Apparatus in accordance with claim 18 wherein said load applying means comprises means for generating a tensile force proportional to a function of airspeed of said airplane, and an elastic member connected to said force transmitting element to exert an elastic tensile force thereon increasing in substantially linear proportion to the lengthwise displacement of said force transmitting element from said dead center position.

ALVIN R. VOGEL.

References Cited in the file of this patent

UNITED STATES PATENTS

| Number | Name | Date |
|---|---|---|
| 1,806,432 | Upson | May 19, 1931 |
| 1,976,479 | Butler | Oct. 9, 1934 |
| 2,205,610 | Van Nes | June 25, 1940 |
| 2,445,343 | Tyra | July 20, 1948 |
| 2,511,446 | Sheer | June 13, 1950 |
| 2,548,481 | Knowler et al. | Apr. 10, 1951 |

FOREIGN PATENTS

| Number | Country | Date |
|---|---|---|
| 569,290 | Great Britain | May 16, 1945 |